(12) United States Patent
Schmidt

(10) Patent No.: US 10,424,112 B2
(45) Date of Patent: Sep. 24, 2019

(54) MESH BOUNDARY SMOOTHING

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 427 days.

(21) Appl. No.: 13/893,196

(22) Filed: May 13, 2013

(65) Prior Publication Data

US 2013/0300735 A1 Nov. 14, 2013

Related U.S. Application Data

(60) Provisional application No. 61/646,603, filed on May 14, 2012.

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01)

(58) Field of Classification Search
CPC ......... G06T 17/20; G06T 19/20; G06T 5/002; G06T 17/205; G06T 17/00; G06F 17/50
See application file for complete search history.

(56) References Cited

U.S. PATENT DOCUMENTS

| | | | |
|---|---|---|---|
| 5,886,702 A | 3/1999 | Migdal et al. | |
| 6,169,549 B1 | 1/2001 | Burr | |
| 6,256,039 B1* | 7/2001 | Krishnamurthy | 345/420 |
| 6,693,631 B2 | 2/2004 | Hubeli et al. | |
| 7,228,191 B2 | 6/2007 | Hofmeister et al. | |
| 2001/0013866 A1* | 8/2001 | Migdal et al. | 345/423 |
| 2004/0075659 A1* | 4/2004 | Taubin | G06T 17/20 345/428 |
| 2006/0290693 A1 | 12/2006 | Zhou et al. | |
| 2006/0290695 A1 | 12/2006 | Salomie | |
| 2007/0165025 A1* | 7/2007 | Shen | G06T 17/20 345/423 |
| 2009/0177454 A1 | 7/2009 | Bronstein | |
| 2010/0226589 A1 | 9/2010 | Mukherjee | |

(Continued)

OTHER PUBLICATIONS

Mencl et al., Improved Laplacian Smoothing of Noisy Surface Meshes, 1999, Eurographics, vol. 18 (1999), No. 3, p. 1-8.*

(Continued)

*Primary Examiner* — Samantha (Yuehan) Wang
(74) *Attorney, Agent, or Firm* — Artegis Law Group, LLP

(57) ABSTRACT

One embodiment of the present invention sets forth a technique for smoothing boundaries associated with meshes of primitives. The technique involves receiving a mesh of primitives that has a mesh boundary and an initial surface, identifying a first vertex associated with the mesh boundary and having a first location, and identifying a second vertex having a second location and a third vertex having a third location. Both the second vertex and third vertex are proximate to the first vertex. The technique further involves determining a fourth location based on the second location and the third location, projecting the fourth location onto the initial surface to determine a fifth location, and moving the first vertex to the fifth location.

17 Claims, 10 Drawing Sheets

(4 of 10 Drawing Sheet(s) Filed in Color)

(56) References Cited

U.S. PATENT DOCUMENTS

| | | |
|---|---|---|
| 2011/0050691 A1 | 3/2011 | Hamedi et al. |
| 2012/0120074 A1 | 5/2012 | Huysmans et al. |
| 2012/0215510 A1 | 8/2012 | Metaxas |

OTHER PUBLICATIONS

Brochu et al, "Efficient Geometrically Exact Continuous Collison Detection", ACM Transactions on Graphics (TOG), vol. 31 No. 4, dated Jul. 1, 2012, New York, US.

Menci et al. Improved Laplacian Smoothing of Noisy Surface Meshes, 1999, Eurographics, vol. 18 (1999), No. 3, pp. 1-8.

Non-Final Office Action for U.S. Appl. No. 13/893,198, dated Sep. 28, 2016, 20 pages.

Non-Final Office Action for U.S. Appl. No. 13/893,191, dated Jul. 7, 2015, 39 pages.

Non-Final Office Action for U.S. Appl. No. 13/893,194, dated Aug. 20, 2015, 19 pages.

Non-Final Office Action for U.S. Appl. No. 13/893,194, dated Oct. 12, 2016, 22 pages.

Sharf et al., SnapPaste: An Interactive Technique for easy Mesh Composition, Aug. 25, 2006, Visual Comput (2006) 22:835-844.

Non-Final Office Action for U.S. Appl. No. 13/892,750, dated May 4, 2015, 17 pages.

Non-Final Office Action for U.S. Appl. No. 13/892,750, dated Sep. 6, 2016, 19 pages.

Final Office Action for U.S. Appl. No. 13/893,198, dated Dec. 30, 2015, 20 pages.

Andre, Lecture 7—Meshing, 2006, Fluent Inc., p. 1-35.

Bloomenthal et al., Polygonization of Non-Manifold Implicit Surfaces, 1995, SIGGRAPH '95 Proceeding of the 22nd annual conference on Computer Graphic and interactive techniques, pp. 309-316.

Turk et al., Zippered Polygon Meshes from Range Images, 1994, ACM 1994 ISBN: 0-89791-667-0, pp. 1-8.

Rocchini et al., The Marching Intersections algorithm for merging range images, Mar. 4, 2004, The Visual Computer (2004) 20:149-164, pp. 149-164.

Non-Final Office Action for U.S. Appl. No. 13/893,198, dated Jul. 29, 2015, 20 pages.

\* cited by examiner

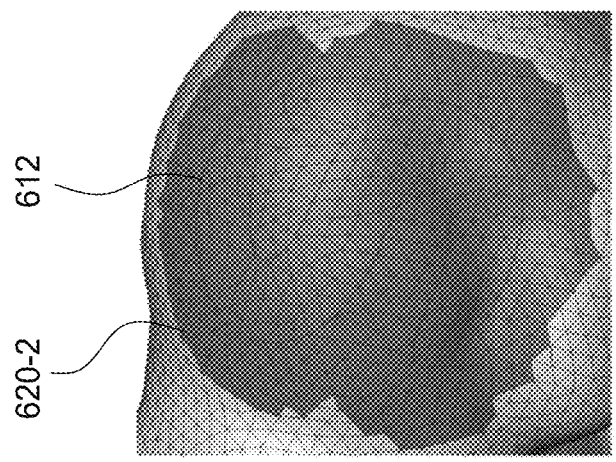
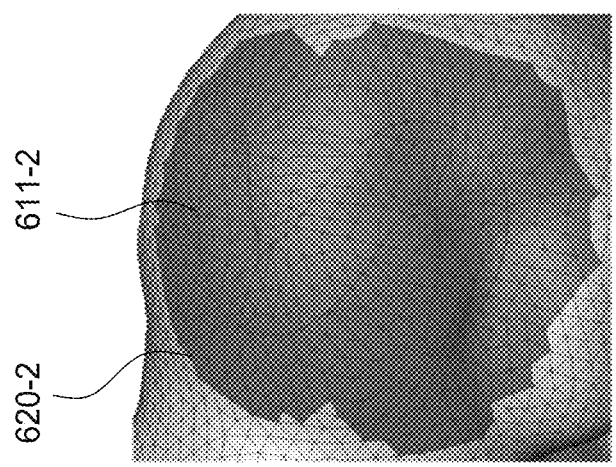
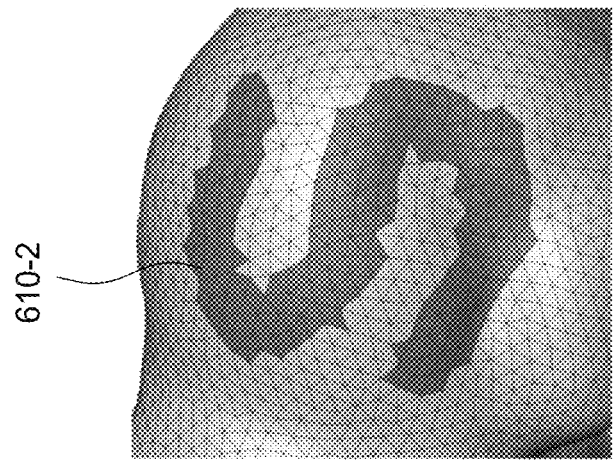

MESH BOUNDARY SMOOTHING

CROSS-REFERENCE TO RELATED APPLICATIONS

This application claims benefit of U.S. Provisional Patent Application Ser. No. 61/646,603, filed May 14, 2012, which is herein incorporated by reference in its entirety.

BACKGROUND OF THE INVENTION

Field of the Invention

Embodiments of the present invention generally relate to computer-aided design (CAD) and, more specifically, to techniques for mesh boundary smoothing.

Description of the Related Art

A wide variety of software applications are currently available to end-users, including computer-aided design (CAD) applications, computer graphics applications, and three-dimensional (3D) modeling applications, among others. Many of these software applications allow an end-user to create and modify 2D and/or 3D designs. For example, an end-user may interact with a 3D modeling application to add geometry to a design, remove geometry from a design, extrude portions of the design, or join two or more designs. Such operations typically are performed by modifying a mesh of primitives (e.g., triangles) associated with the design.

In conventional software applications, modifying a triangle mesh associated with a design (e.g., by adding, removing, extruding, or merging geometry) can introduce distortions and irregularities to the mesh. For example, extruding a region of the mesh can produce an extrusion boundary having rough, irregular edges that reflect the boundary triangles of the mesh region selected for extrusion. Moreover, manually smoothing a boundary to perform an extrusion can be tedious and time-consuming for the end-user. Further, applying conventional smoothing algorithms to an extruded boundary often produces unsatisfactory results (e.g., rounded, poorly-defined extrusions).

As the foregoing illustrates, there is a need in the art for a more effective way to enable application end-users to apply smoothing operations to the boundaries of primitive meshes.

SUMMARY OF THE INVENTION

One embodiment of the present invention sets forth a method for smoothing boundaries associated with meshes of primitives. The method involves receiving a mesh of primitives that has a mesh boundary and an initial surface, identifying a first vertex associated with the mesh boundary and having a first location, and identifying a second vertex having a second location and a third vertex having a third location. Both the second vertex and third vertex are proximate to the first vertex. The method further involves determining a fourth location based on the second location and the third location, projecting the fourth location onto the initial surface to determine a fifth location, and moving the first vertex to the fifth location.

Further embodiments provide a non-transitory computer-readable medium and a computing device to carry out at least the method steps set forth above.

Advantageously, the disclosed technique allows a user to perform smoothing of mesh boundaries, for example, to produce mesh extrusions having smooth edges. Boundary smoothing may be performed by incrementally shifting boundary vertices and projecting the smoothed locations of the boundary vertices onto the initial mesh surface to preserve the mesh shape. The disclosed technique, among other things, enables users to more efficiently smooth selected mesh boundaries and perform high-quality mesh extrusions without significantly distorting surrounding regions of the mesh.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and with payment of the necessary fee.

FIGS. 9A-9C illustrate a smoothed mesh boundary and an inflated mesh boundary generated with the boundary smoothing engine, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
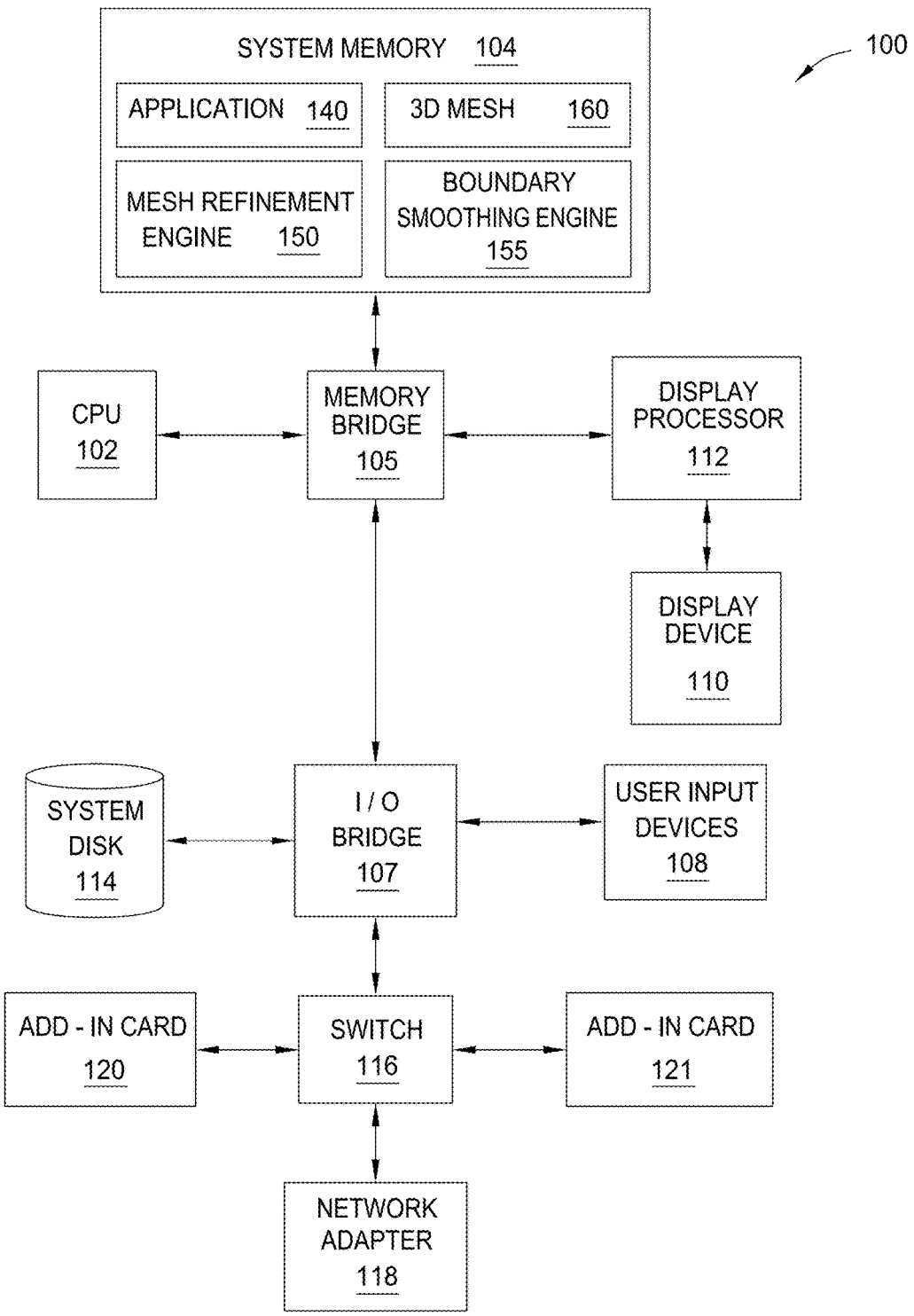
FIG. 1 illustrates a computing device configured to implement one or more aspects of the present invention.

FIG. 1 illustrates a computing device 100 configured to implement one or more aspects of the present invention. As shown, computing device 100 includes a memory bridge 105 that connects a central processing unit (CPU) 102, an input/output (L/O) bridge 107, a system memory 104, and a display processor 112.

Computing device 100 may be a computer workstation, a personal computer, video game console, personal digital assistant, mobile phone, mobile device or any other device suitable for practicing one or more embodiments of the present invention. As shown, the central processing unit (CPU) 102 and the system memory 104 communicate via a bus path that may include a memory bridge 105. CPU 102 includes one or more processing cores, and, in operation, CPU 102 is the master processor of computing device 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., conventional cathode ray tube, liquid crystal display, light-emitting diode, plasma, organic light-emitting diode, or surface-conduction electron-emitter based display). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network and may include wired or wireless communication over local area networks and wide area networks, such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

In one embodiment, application 140, mesh refinement engine 150, a boundary smoothing engine 155, and 3D mesh 160 are stored in system memory 104. Although FIG. 1 shows the mesh refinement engine 150 and boundary smoothing engine 155 as separate software modules, the mesh refinement engine 150 and boundary smoothing engine 155 may be part of the same software executable. Additionally, the mesh refinement engine 150 and boundary smoothing engine 155 may be integrated into the application 140 or offered as software add-ons or plug-ins for the application 140. Application 140 may be a CAD (computer aided design) application program configured to generate and display graphics data included in the 3D mesh 160 on display device 110. For example, the 3D mesh 160 could define one or more graphics objects that represent a 3D model designed using the CAD system or a character for an animation application program.

The mesh refinement engine 150 is configured to modify a mesh (e.g., 3D mesh 160) by performing one or more refinement operations on the mesh. The refinement operations may be applied to add, remove, replace, shift, etc. vertices and/or edges included in the mesh. For example, an edge operation may be performed on the mesh to add an edge (e.g., a triangle edge) to the mesh, remove an edge from the mesh, and/or shift the position of an edge in the mesh. Additionally, a vertex operation may be performed to add a vertex to the mesh, remove a vertex from the mesh, and/or shift the position of a vertex in the mesh. Other types of refinement operations, such as smoothing operations, also may be performed to improve the visual appearance of a mesh.

The mesh refinement engine 150 enables a user to iteratively refine a mesh, for example, by repairing mesh distortions produced when adding geometry to a mesh, removing geometry from a mesh, modifying the geometry of a mesh, and the like. For example, moving vertices to modify the shape of a mesh boundary may distort the mesh, producing mesh triangles having irregular sizes and angles near the modified boundary. Such irregularities may produce computational issues and/or visual artifacts during subsequent processing of the mesh. However, by performing mesh refinement operations before, while, and/or after modifying a mesh boundary, mesh distortions may be reduced or eliminated.

The boundary smoothing engine 155 may be configured to prepare a mesh for an extrusion operation by moving vertices associated with a mesh boundary to create a smooth, aesthetic boundary. In addition, the boundary smoothing engine 155 may be configured to project the smoothed vertex positions onto the initial surface of the mesh (e.g., a surface associated with a position of the mesh prior to performing boundary smoothing) to preserve an approximate shape of the original mesh. Once the mesh boundary has been sufficiently smoothed, an extrusion operation may be performed on the mesh to produce a mesh extrusion having smooth edges. Further, the mesh refinement engine 150 may perform mesh refinement passes on vertices proximate to the mesh boundary in order to repair mesh distortions produced by the boundary smoothing operation. The details of various mesh refinement operations are described below with respect to FIGS. 2-5.

Figure 2:
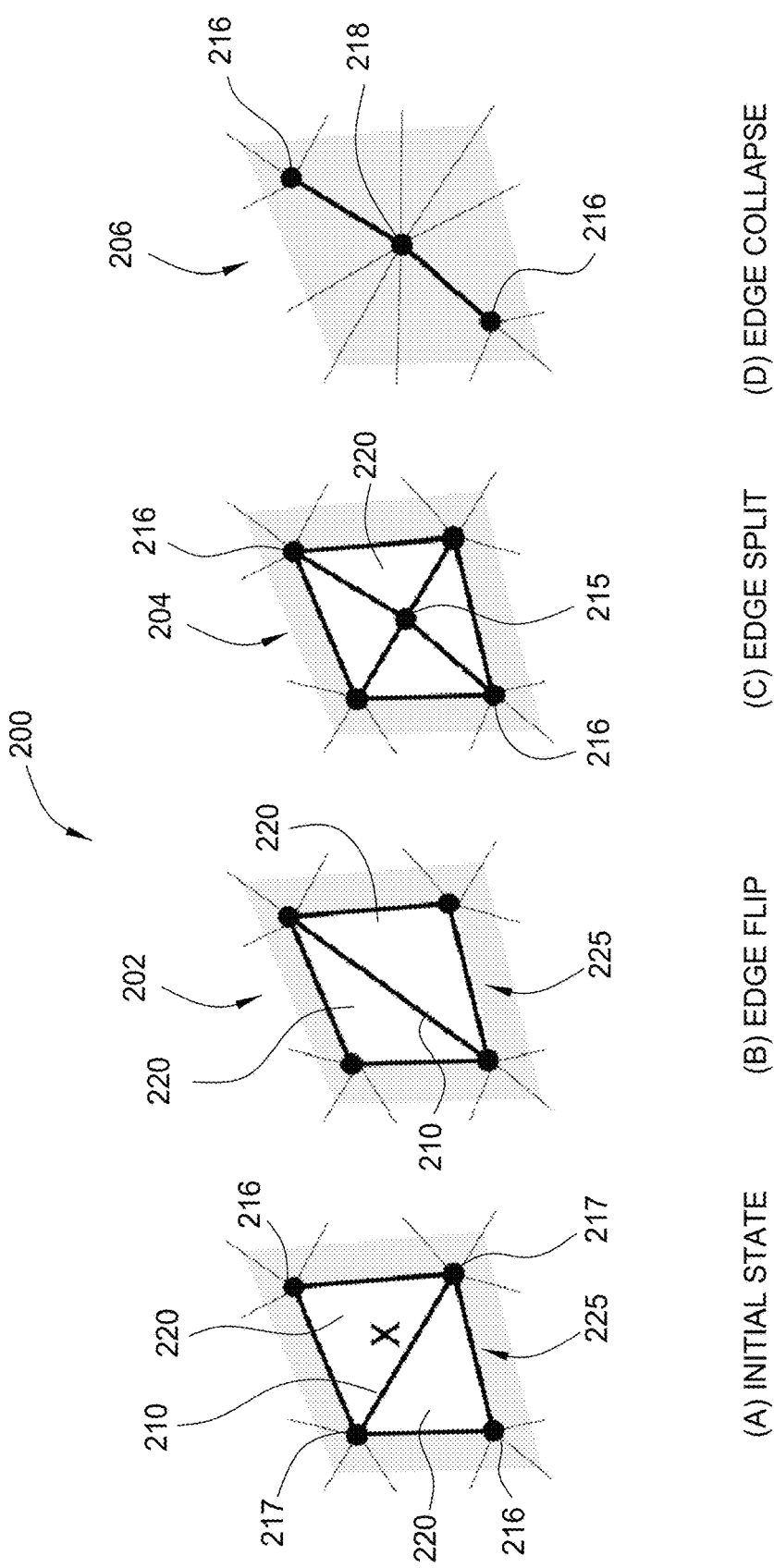
FIG. 2 illustrates edge operations for refining a mesh, according to one embodiment of the present invention.

FIG. 2 illustrates edge operations 200 for refining a mesh, according to one embodiment of the present invention. Edge operations 200 may be performed on a mesh to add an edge, remove an edge, and/or shift the position of an edge. Edge operations 200 may be applied to a mesh on a per-edge basis, or multiple edges may be processed in parallel.

As shown, the edge operations 200 include an edge flip operation 202, an edge split operation 204, and an edge collapse operation 206. An edge flip operation 202 is performed to rotate an edge 210 within the quadrilateral 225 formed by the two triangles 220 connected to the edge 210. An edge split operation 204 is performed to replace the two triangles 220 connected to the edge 210 with four triangles 220 by inserting a vertex 215 into the edge 210 and connecting the vertex 215 to the two vertices 216 opposite the edge 210. An edge collapse operation 206 removes the triangles 220 connected to the edge 210 and shifts the vertices 217 connected to the edge 210 to a new vertex position 218 (e.g., a midpoint of the initial edge 210). Conditions under which these edge operations 200 may be performed are described in further detail below with respect to FIG. 5.

Figure 3:
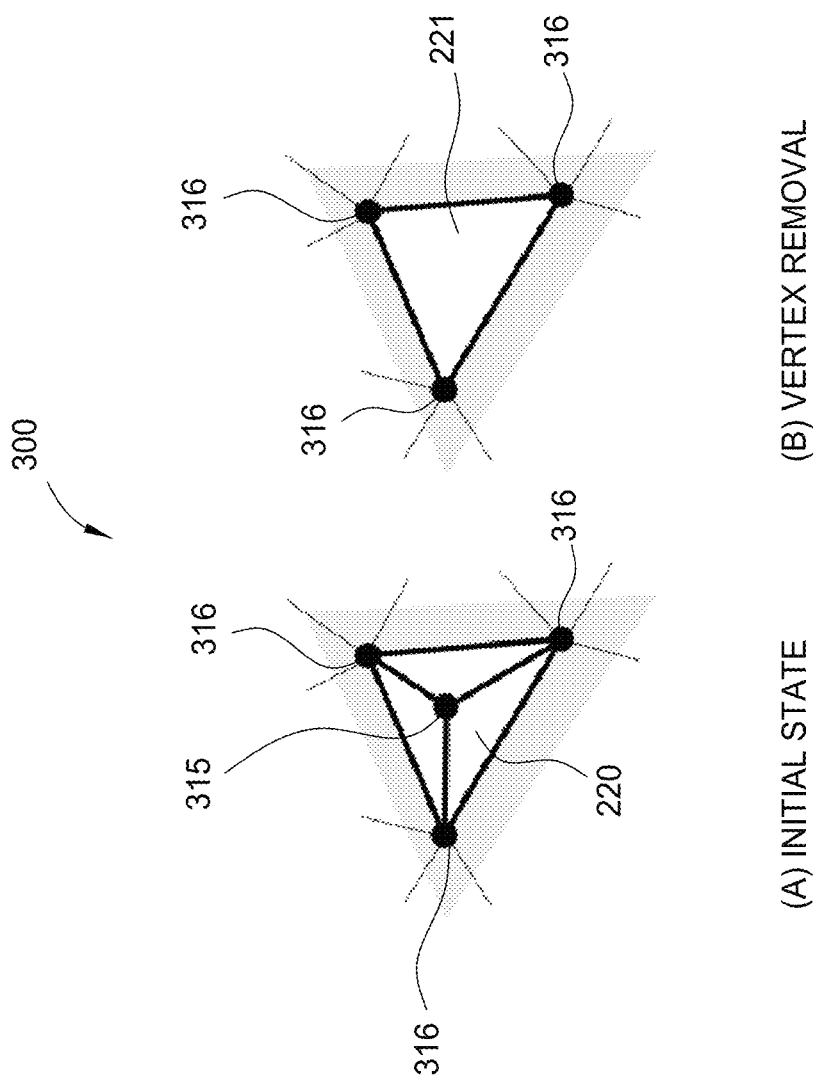
FIG. 3 illustrates a vertex removal operation for refining a mesh, according to one embodiment of the present invention.

FIG. 3 illustrates a vertex removal operation 300 for refining a mesh, according to one embodiment of the present invention. The vertex removal operation 300 may be applied to a mesh on a per-vertex basis, or multiple vertices may be processed in parallel. The vertex removal operation 300 may be performed to remove a vertex 315 connected to only three neighboring vertices 316 (i.e., a vertex 315 having a valence of three), also known as a tip vertex. Tip vertices 315 are necessarily surrounded by triangles 220 having large opening angles and, thus, may cause computational issues during subsequent processing of a mesh. Additionally, tip vertices 315 may collapse into the plane of their surrounding vertices 316 (e.g., when applying smoothing algorithms) and, as a result, may add little or no detail to the mesh. Consequently, to avoid such issues, tip vertices 315 may be removed via a vertex removal operation 300. After removal of a tip vertex 315, a new triangle 221 may be added to the mesh. Conditions under which a vertex removal operation 300 may be performed are described in further detail below with respect to FIG. 5.

Figure 4:
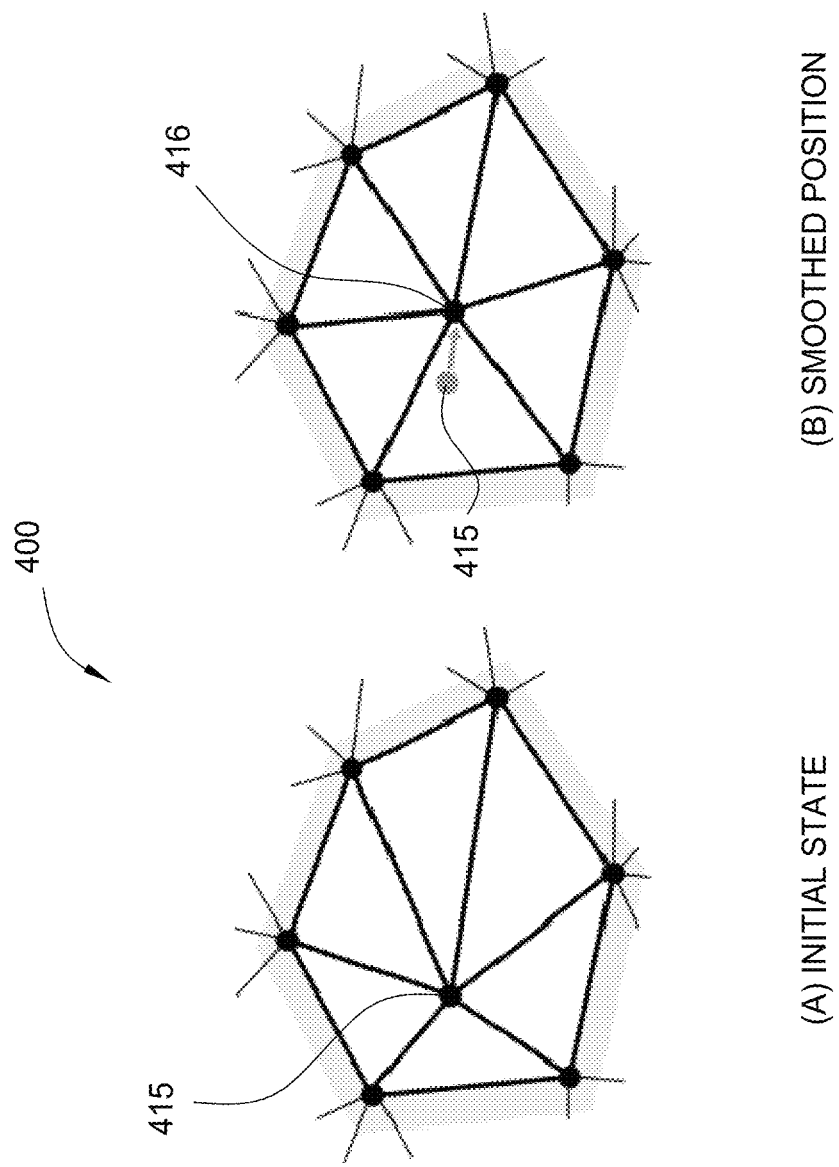
FIG. 4 illustrates a smoothing operation for refining a mesh, according to one embodiment of the present invention.

FIG. 4 illustrates a smoothing operation 400 for refining a mesh, according to one embodiment of the present invention. The smoothing operation 400 may be performed to more evenly distribute vertices in the mesh. In addition to improving the overall visual appearance of the mesh, the smoothing operation may be performed to reduce the number of small, irregularly-sized triangles that occur along mesh boundaries. Such triangles may be generated when edge operations are performed along preserved boundaries.

As shown, the smoothing operation 400 may shift a vertex 415 from an initial position to a smoothed vertex position 416. The location of the smoothed vertex position 416 may be based on a smoothing algorithm (e.g., a Laplacian smoothing algorithm) and a smoothing strength factor. Additional details regarding the smoothing operation 400 are described below with respect to FIG. 5.

Figure 5:
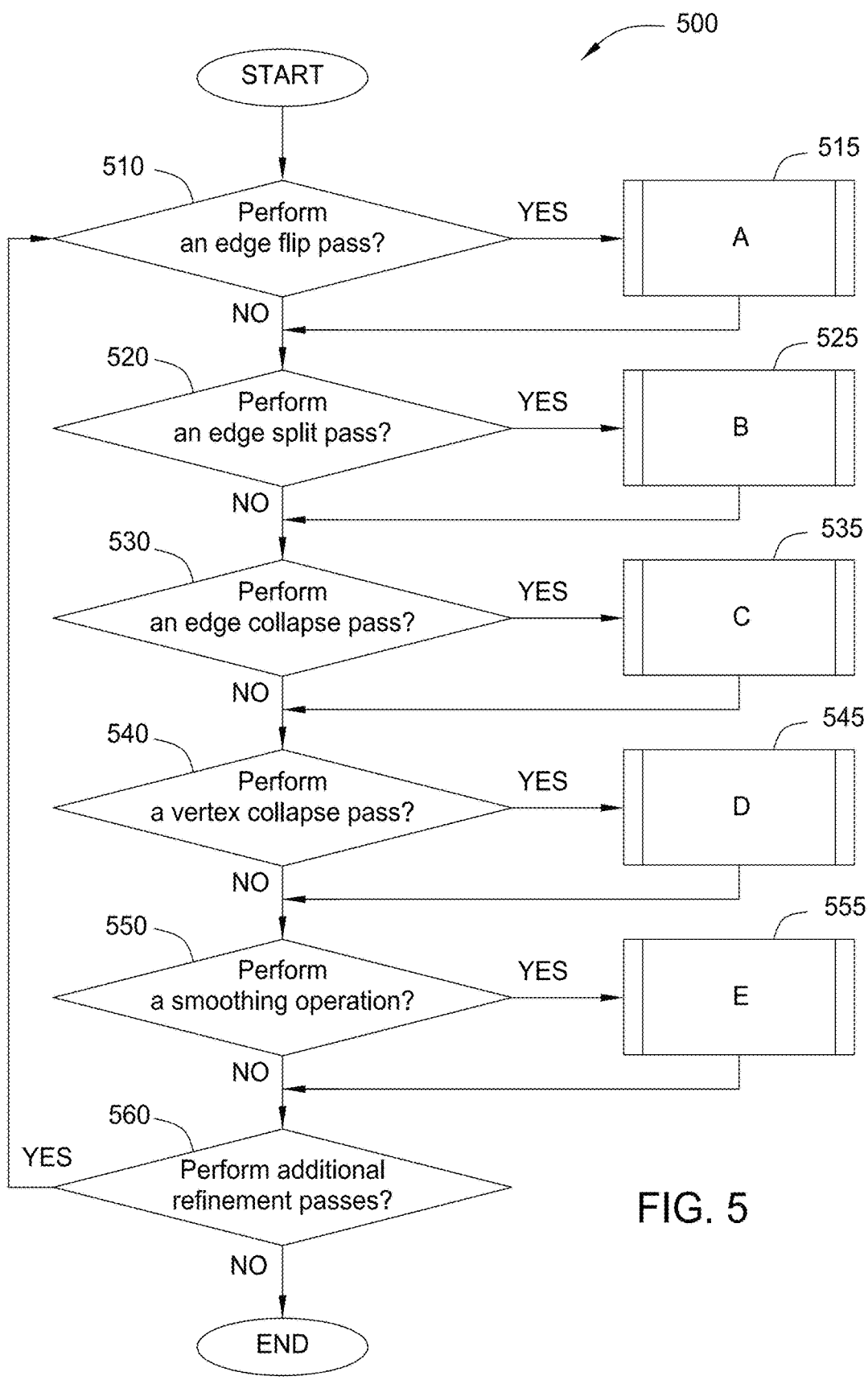
FIG. 5 is a flow diagram of method steps for refining a mesh of primitives, according to one embodiment of the present invention.

FIG. 5 is a flow diagram of method steps for refining a mesh of primitives, according to one embodiment of the present invention. Although the method steps are described in conjunction with the system of FIG. 1, persons skilled in the art will understand that any system configured to perform the method steps, in any order, falls within the scope of the present invention. Further, although mesh refinement operations are described as being performed in a particular order, the mesh refinement operations may be reordered and/or various mesh refinement operations may be repeated or omitted.

As shown, a method 500 begins at step 510, where the mesh refinement engine 150 determines whether to perform an edge flip pass on one or more edges 210 included in a mesh. During the edge flip pass, the mesh refinement engine 150 processes the edge(s) 210 to determine whether an edge flip operation 202 should be performed on the edge(s) 210. If the mesh refinement engine 150 determines that an edge flip pass should be performed, then subprocess A is executed at step 515.

Subprocess A—Edge Flip Operation

Upon executing subprocess A at step 515, the mesh refinement engine 150 identifies a triangle edge 210 included in a mesh. The mesh refinement engine 150 then optionally determines whether the edge 210 is on a preserved boundary of the mesh. A preserved boundary may include a limit (e.g., an outermost perimeter) of the mesh itself and/or a boundary selected by a user or generated by the mesh refinement engine 150. For example, the user may select a region of interest (ROI) in which mesh refinement operations are to be performed. Upon selecting the ROI, the user may further determine whether mesh refinement operations performed within the ROI are permitted to affect regions of the mesh that are outside of the ROI (e.g., in proximity to the ROI). If the mesh refinement operations are permitted to affect regions of the mesh outside of the ROI, then triangles adjacent or proximate to the ROI may be modified when performing mesh refinement operations. If the mesh refinement operations are not permitted to affect regions of the mesh outside of the ROI (i.e., the ROI boundary is a preserved boundary), then the position, shape, etc. of the ROI boundary may be retained, and triangles outside of the ROI are not modified when performing mesh refinement operations. Additionally, the user may pin one or more locations along the ROI boundary to prevent the mesh refinement engine 150 from modifying the position and shape of vertices and triangles at the pinned locations while allowing the mesh refinement engine 150 to modify other (e.g., unpinned) locations along the ROI boundary.

If the edge 210 is located on a preserved boundary (e.g., an ROI boundary, perimeter of the mesh, etc.), then the mesh refinement engine 150 determines not to flip the edge 210. As such, the preserved boundary is not modified. If the edge 210 is not located on a preserved boundary, then the mesh refinement engine 150 determines a potential flipped edge 210. Next, the mesh refinement engine 150 computes the length of the flipped edge 210 and compares this length to the product of a flip threshold $K_{flip}$ and the length of the initial edge 210. The flip threshold $K_{flip}$ is intended to reduce the occurrence of edge flips that do not significantly improve mesh quality. For example, by setting the flip threshold $K_{flip}$ to a value of 0.9, an edge 210 is flipped only if the flipped edge 210 is appreciably shorter than the initial edge 210. Other values for the flip threshold $K_{flip}$ (e.g., 0.95, 0.8, 0.75, etc.) may be selected as well.

If the length of the flipped edge 210 is greater than the product of the flip threshold $K_{flip}$ and the length of the initial edge 210, then the mesh refinement engine 150 determines not to flip the edge 210. If the length of the flipped edge 210 is not greater than the product of the flip threshold $K_{flip}$ and the length of the initial edge 210, then the mesh refinement engine 150 next determines a distance between the midpoint of the initial edge 210 and the midpoint of the flipped edge 210. The distance is then compared to the product of the midpoint threshold $K_{midpoint}$ and the length of the initial edge 210. The midpoint threshold $K_{midpoint}$ is intended to reduce the occurrence of edge flips that significantly change the shape of the mesh. For example, by setting the midpoint threshold $K_{midpoint}$ to a value of 0.2, an edge 210 is flipped only if the flipped edge 210 is in a plane that is near the plane in which the initial edge 210 resides. Other values for the midpoint threshold $K_{midpoint}$ (e.g., 0.1, 0.3, etc.) may be selected as well.

If the distance is greater than the product of the midpoint threshold $K_{midpoint}$ and the length of the initial edge 210, then the mesh refinement engine 150 determines not to flip the edge 210. If the distance is not greater than the product of the midpoint threshold $K_{midpoint}$ and the length of the initial edge 210, then the mesh refinement engine 150 next determines whether flipping the edge 210 would create a non-manifold edge. A non-manifold edge may be defined as an edge that is shared by more than two faces (e.g., an edge shared by more than two triangles). If flipping the edge 210 would create a non-manifold edge, then the mesh refinement engine 150 determines not to flip the edge 210. If flipping the edge 210 would not create a non-manifold edge, then the mesh refinement engine 150 flips the edge 210. Finally, the mesh refinement engine 150 determines whether to process another edge 210 included in the mesh. If another edge 210 is to be processed by the mesh refinement engine 150, then the mesh refinement engine 150 identifies another edge 210 included in the mesh and repeats the process described above. If no additional edges 210 are to be processed, then subprocess A ends, and the method proceeds to step 520.

At step 520, the mesh refinement engine 150 determines whether to perform an edge split pass on one or more edges 210 included in a mesh (e.g., to determine whether an edge split operation 204 should be performed on the edge(s) 210). If the mesh refinement engine 150 determines that an edge split pass should be performed, then subprocess B is executed at step 525.

Subprocess B—Edge Split Operation

Upon executing subprocess B at step 525, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to split the edge 210. If the edge 210 is not located on a preserved boundary, then the mesh refinement engine 150 compares a weighted length of the edge 210 to a split threshold $K_{split}$. The split threshold $K_{split}$ may be defined as the target maximum edge length. That is, by performing this comparison, at the end of an edge split pass, all processed edges 210 may be shorter than the split threshold $K_{split}$ length.

The weighting applied to the length of the edge 210 may be based on the per-vertex refinement weights assigned to the two vertices 217 to which the edge 210 is connected. The per-vertex refinement weights may be assigned to vertices by the mesh refinement engine 150, or the per-vertex refinement weights may be based on user selection (e.g., based on a weight refinement mask). In general, refinement weights assigned to vertices, edges, etc. may control the conditions under which a refinement operation is performed. For example, assigning a higher weighting to a vertex may increase the likelihood that a refinement operation will be performed on the vertex (e.g., a vertex collapse operation 300) or on an edge associated with the vertex (e.g., an edge split operation 204). Conversely, assigning a lower weighting to a vertex may decrease the likelihood that a refinement operation will be performed on the vertex or on an edge associated with the vertex. Further, assigning a zero weighting to a vertex may indicate that a refinement operation will not be performed on the vertex or on an edge associated with the vertex.

If the weighted length of the edge 210 is not greater than the split threshold $K_{split}$, then the mesh refinement engine 150 determines not to split the edge 210. If the weighted length of the edge 210 is greater than the split threshold $K_{split}$, then the mesh refinement engine 150 adds the edge 210 to a split edge list. Next, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then the edge(s) 210 included in the split edge list are optionally sorted by length. Finally, the edge(s) 210 included in the split edge list are split. If the edges 210 were sorted, then the edges 210 included in the split edge list may be split in order of longest edge length to shortest edge length. Once all edges on the split edge list have been split, subprocess B ends, and the method proceeds to step 530.

At step 530, the mesh refinement engine 150 determines whether to perform an edge collapse pass on one or more edges 210 included in a mesh (e.g., to determine whether an edge collapse operation 206 should be performed on the edge(s) 210). If the mesh refinement engine 150 determines that an edge collapse pass should be performed, then subprocess C is executed at step 535.

Subprocess C—Edge Collapse Operation

Upon executing subprocess C at step 535, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to collapse the edge 210. If the edge 210 is not located on a preserved boundary, then the mesh refinement engine 150 next determines whether at least one of two inequalities are satisfied. With reference to the first inequality, the mesh refinement engine 150 determines whether a weighted length (e.g., based on per-vertex refinement weights described above) of the edge 210 is greater than a collapse threshold $K_{collapse}$.

The collapse threshold $K_{collapse}$ is intended to collapse edges 210 that are shorter than the value assigned to this threshold. With reference to the second inequality, the mesh refinement engine 150 determines whether a minimum opposing angle of one of the two triangles connected to the edge 210 is less than a target angle $T_{collapse}$. The target angle $T_{collapse}$ is intended to collapse triangles 220 having an angle that is less than the value assigned to this target. Thus, after an edge collapse pass, all angles included in the processed triangles 220 may be greater than the target angle $T_{collapse}$. Furthermore, because this criterion is scale-independent (e.g., the target angle $T_{collapse}$ does not depend on the relative size of triangles in the mesh), mesh quality may be significantly improved even if $K_{collapse}$ is assigned an inappropriate value.

If one or both of the first inequality and second inequality are satisfied, the mesh refinement engine 150 then determines whether collapsing the edge 210 would create a non-manifold edge. If collapsing the edge 210 would create a non-manifold edge, then the mesh refinement engine 150 determines not to collapse the edge 210. If collapsing the edge 210 would not create a non-manifold edge, then the mesh refinement engine 150 collapses the edge 210. Finally, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then subprocess C ends, and the method proceeds to step 540.

At step 540, the mesh refinement engine 150 determines whether to perform a vertex collapse pass on one or more vertices 315 included in a mesh (e.g., to determine whether a vertex collapse operation 300 should be performed on the vertices 315). If the mesh refinement engine 150 determines that a vertex collapse pass should be performed, then subprocess D is executed at step 545.

Subprocess D—Vertex Collapse Operation

Upon executing subprocess D at step 545, the mesh refinement engine 150 identifies a triangle vertex 315 included in a mesh. The mesh refinement engine 150 then optionally determines whether the vertex 315 is on a preserved boundary of the mesh. If the vertex 315 is located on a preserved boundary (e.g., an ROI boundary, perimeter of the mesh, etc.), then the mesh refinement engine 150 determines not to collapse the vertex 315. If the vertex 315 is not located on a preserved boundary, then the mesh refinement engine 150 determines whether the vertex 315 has a valence equal to three (i.e., the vertex 315 is connected to only three neighboring vertices 316). If the vertex 315 does not have a valence equal to three, then the vertex 315 is not collapsed.

If the vertex 315 has a valence equal to three, then the mesh refinement engine 150 optionally determines whether all triangles connected to the vertex 315 are located within the ROI. If all triangles connected to the vertex 315 are not located within the ROI, then the vertex 315 is not collapsed. If all triangles connected to the vertex 315 are located within the ROI, then the mesh refinement engine 150 next determines whether a neighboring vertex 316 has a valence higher than three. If no neighboring vertex 316 has a valence higher than three, then the vertex 315 is not collapsed. If a neighboring vertex 316 has a valence higher than three, then the vertex 315 is collapsed and a new triangle 221 is added to the mesh. Finally, the mesh refinement engine 150 determines whether to process another vertex 315 included in the mesh. If another vertex 315 is to be processed by the mesh refinement engine 150, then another vertex 315 included in the mesh is identified, and the process described above is repeated. If no additional vertices 315 are to be processed, then subprocess D ends, and the method proceeds to step 550.

At step 550, the mesh refinement engine 150 determines whether to perform a smoothing operation 400 on one or more vertices 415 included in a mesh. If the mesh refinement engine 150 determines that a smoothing operation 400 should be performed, then subprocess E is executed at step 555.

Subprocess E—Smoothing Operation

Upon executing subprocess E at step 555, the mesh refinement engine 150 identifies a triangle vertex 415 included in a mesh. The mesh refinement engine 150 then determines a smoothed vertex position 416. The smoothed vertex position 416 may be determined using a smoothing algorithm, such as a uniform Laplacian smoothing algorithm. Next, a smoothing weight may be determined based on a strength factor and/or a weight function value. The strength factor may be a user-defined value (e.g., a brush tool parameter in application 140). The weight function value may be based on a weight mask generated by the mesh refinement engine 150 or defined by the user.

Next, a weighted vertex position is determined based on the smoothed vertex position 416 and (optionally) based on the smoothing weight. For example, the weighted vertex position may be computed by interpolating the initial vertex position 415 and the smoothed vertex position 416 or by performing linear blending using the initial vertex position 415 (V), the smoothed vertex position 416 (V'), and the smoothing weight (WS). An exemplary formula for performing linear blending to determine a weighted vertex position (V") is provided in Equation 1, below.

$$V''=(1-WS) \times V + (WS) \times V'$$ (Eq. 1)

Finally, at step 560, the mesh refinement engine 150 determines whether to perform additional mesh refinement passes. If the mesh refinement engine 150 determines that additional refinement passes should be performed, then the method returns to step 510, as previously described herein. Alternatively, upon determining that additional refinement passes should be performed, the method may return to any of step 510, step 520, step 530, step 540, and/or step 550, as also previously described herein. Furthermore, the flow diagram may be traversed such that one or more of the edge operations 200 are performed before and/or after the vertex collapse operation 300 and/or the smoothing operation 400. If the mesh refinement engine 150 determines that additional refinement passes should not be performed, then the method ends.

In addition to repairing mesh distortions and irregularities, the mesh refinement engine 150 enables a user to perform other types of mesh operations. For example, when used in conjunction with the boundary smoothing engine 155, the mesh refinement engine 150 enables a user to produce a mesh extrusion having smooth edges in a manner that requires relatively little pre-processing workload. Such techniques are described below in further detail.

Mesh Boundary Smoothing

Figure 6A:
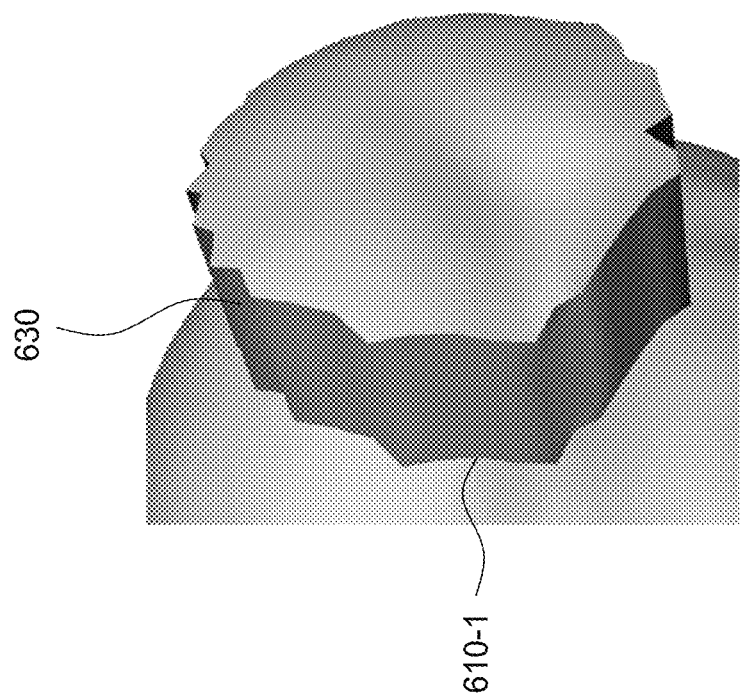
FIGS. 6A and 6B illustrate an extrusion operation performed on a mesh, according to one embodiment of the present invention.
Figure 6B:
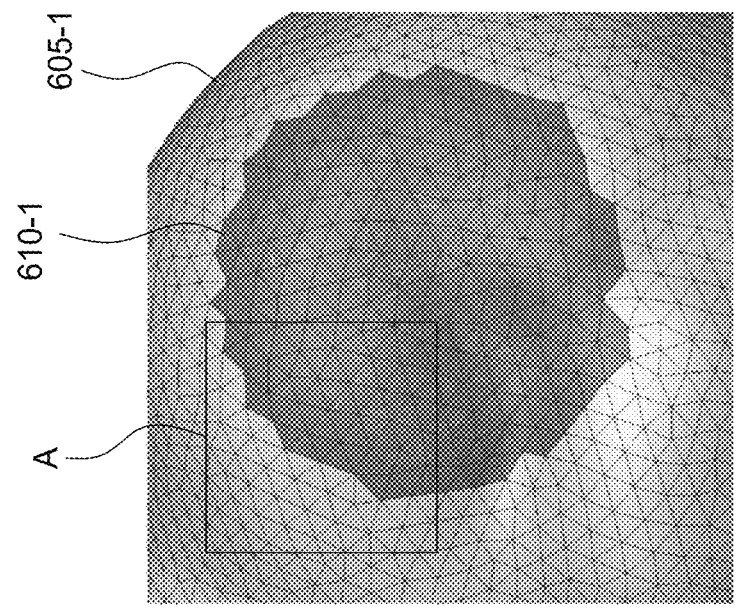

FIGS. 6A and 6B illustrate an extrusion operation performed on a mesh 605-1, according to one embodiment of the present invention. To perform an extrusion operation, a user may select a mesh boundary 610 (e.g., 610-1) associated with a 3D mesh 605 (e.g., 605-1) and extrude the mesh boundary 610 by an extrusion length. In general, the edges of a mesh extrusion 630 are based on the characteristics of the mesh boundary 610 selected for extrusion. Consequently, because the mesh boundary 610-1 selected by the user in FIG. 6A includes jagged triangle edges, the resulting mesh extrusion 630 has a rough, unattractive appearance, as shown in FIG. 6B.

Figure 6C:
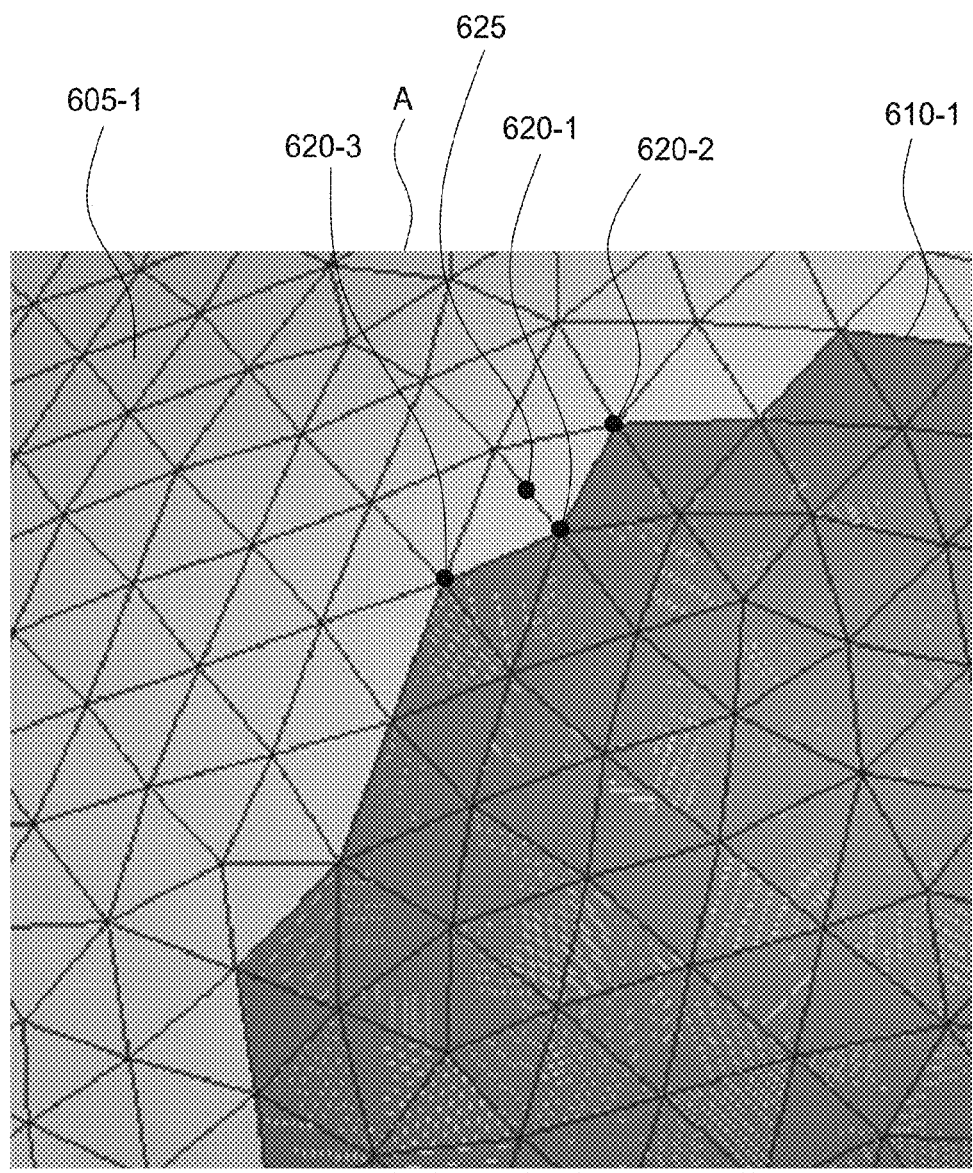
FIG. 6C illustrates region A of the mesh illustrated in FIG. 6A, according to one embodiment of the present invention.

FIG. 6C illustrates region A of the mesh 605-1 illustrated in FIG. 6A, according to one embodiment of the present invention. As shown, the mesh boundary 610-1 includes a plurality of vertices 620 (e.g., 620-1, 620-2, 620-3) which form a jagged boundary. As described above, the edges of a mesh extrusion 630 are generally based on the characteristics of the mesh boundary 610 selected for extrusion. Consequently, in order to produce a mesh extrusion 630 having smooth edges, the boundary smoothing engine 155 and mesh refinement engine 150 may be used to perform one or more boundary smoothing and mesh refinement passes on the 3D mesh 605-1. An exemplary method for smoothing mesh boundaries 610 is described below with respect to FIG. 7.

Figure 7:
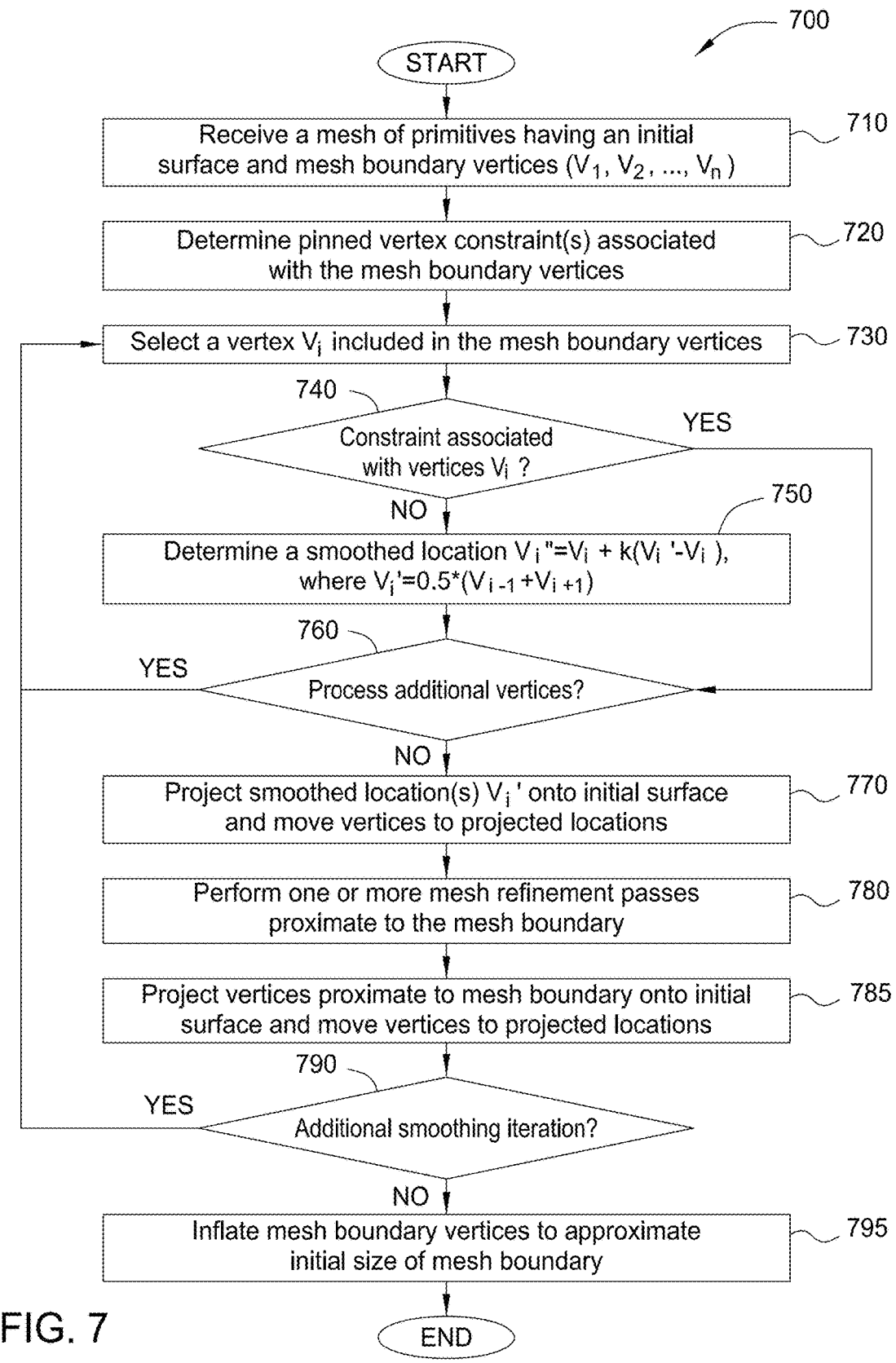
FIG. 7 is a flow diagram of method steps for smoothing a mesh boundary associated with a mesh of primitives, according to one embodiment of the present invention.

FIG. 7 is a flow diagram of method steps for smoothing a mesh boundary 610 associated with a mesh 605 of primitives, according to one embodiment of the present invention. Although the method steps are described in conjunction with the system of FIG. 1, persons skilled in the art will understand that any system configured to perform the method steps, in any order, falls within the scope of the present invention.

As shown, a method 700 begins at step 710, where the boundary smoothing engine 155 receives a mesh 605 (e.g., 605-1) of primitives having an initial surface and a plurality of vertices 620 (e.g., 620-1, 620-2, 620-3) associated with a mesh boundary 610 (e.g., 610-1). The vertices 620 may define a mesh boundary 610 on which a mesh extrusion operation is to be performed. The initial surface of the mesh 605 may include the locations (e.g., locations defined in three-dimensional space) of one or more planes, edges, points, etc. associated with the mesh 605 prior to performing a boundary smoothing operation on the mesh 605. That is, the initial surface may represent the general shape of the mesh 605 prior to modifying the mesh via a boundary smoothing operation.

At step 720, the boundary smoothing engine 155 determines whether one or more pinned vertex constraints have been assigned to vertices 620 associated with the mesh boundary 610. When a pinned vertex constraint is assigned to a vertex 620, the location of the vertex 620 is not modified by the boundary smoothing engine 155 and/or mesh refinement engine 150 during boundary smoothing and/or mesh refinement passes. Pinned vertex constraints may be assigned to one or more vertices by a user (e.g., to manually preserve the shape of one or more regions of a mesh 605) or pinned vertex constraints may be assigned by the boundary smoothing engine 155. For example, the boundary smoothing engine 155 may detect a sharp corner associated with a mesh boundary 610 and assign a pinned vertex constraint to a vertex 620 associated with the sharp corner (e.g., in order to preserve a detailed shape of a mesh boundary 610), and/or the boundary smoothing engine 155 may detect a preserved boundary in the mesh 605 (e.g., an outermost boundary or interior boundary of the mesh 605) and assign a pinned vertex constraint to a vertex 620 associated with the preserved boundary. In another example, the boundary smoothing engine 155 may identify a known geometric shape (e.g., plane, cylinder, triangle, square, etc.) in the mesh 605 and assign pinned vertex constraints to one or more vertices 620 in order to preserve the approximate shape of the geometric shape.

Next, at step 730, the boundary smoothing engine 155 selects a vertex 620 (e.g., 620-1) associated with the mesh boundary 610 (e.g., 610-1). The vertex 620 selected by the boundary smoothing engine 155 may be selected according to a vertex ordering (e.g., the order of vertices on a mesh boundary 610), or the vertex 620 may be selected based on user input. For example, a user may operate a brush tool to select vertices 620 to which a boundary smoothing operation is to be applied, providing the user with the ability to control the amount of smoothing applied to different regions of the mesh boundary 610.

At step 740, the boundary smoothing engine 155 determines whether a pinned vertex constraint is assigned to the vertex 620. If a pinned vertex constraint is assigned to the vertex 620, then no smoothing is applied to the vertex 620, and the boundary smoothing engine 155 determines whether to process another vertex 620 at step 760. If a pinned vertex constraint is not assigned to the vertex 620, then in step 750 the boundary smoothing engine 155 determines a smoothed location 625 of the vertex 620. The smoothed location 625 ($V_i''$) may be determined by first calculating an average location ($V_i'$) based on the locations ($V_{i-1}$, $V_{i+1}$) of neighboring vertices 620 (e.g., 620-2 and 620-3). For example; an average location $V_i'$ may be determined by adding a vector associated with the location of the first neighboring vertex $V_{i-1}$ to a vector associated with the location of the second neighboring vertex $V_{i+1}$ and dividing the resulting vector by two. The boundary smoothing engine 155 may then apply a smoothing strength factor k to the average location $V_i'$ to determine a smoothed location $V_i''$. The smoothing strength factor k may be used to control the amount of smoothing applied to the mesh boundary 610 (e.g., the amount of smoothing per boundary smoothing pass). In FIG. 6C, a smoothing strength factor k of 0.9 has been applied; in other implementations, a smoothing strength factor of 0.5 may produce high-quality results. An exemplary formula for determining a smoothed location $V_i''$ using a smoothing strength factor k is provided in Equation 2, below, where k is in the range [0,1].

$$V_i''=V_i+k(V_i'-V_i), \text{ where } V_i'=0.5*(V_{i-1}+V_{i+1}) \tag{Eq. 2}$$

At step 760, the boundary smoothing engine 155 determines whether to process another vertex 620. If another vertex is to be processed, then the boundary smoothing engine 155 returns to step 730, where another vertex 620 is selected. If another vertex 620 is not processed, then in step 770 the boundary smoothing engine 155 optionally projects the smoothed location(s) onto the initial surface of the mesh 605 to determine one or more projected locations.

The vertex (or vertices) are then moved to the projected locations. As described above, projecting the vertices onto the initial surface preserves the approximate shape of the mesh 605 during the boundary smoothing operation. Alternatively, if the vertices are not projected onto the initial surface, then the vertex (or vertices) may be moved to the smoothed location(s).

Optionally, at step 780, one or more mesh refinement passes (e.g., a smoothing operation 400) may be performed on vertices proximate to the mesh boundary 610, for example, in order to repair mesh distortions produced during the boundary smoothing operation. After performing the one or more mesh refinement passes, the vertices proximate to the mesh boundary 610 optionally may be projected onto the initial surface in order to approximate the initial shape of the mesh at step 785.

At step 790, the boundary smoothing engine 155 determines whether an additional boundary smoothing pass is to be performed. In one implementation, the boundary smoothing operation described above may be repeated on vertices 620 associated with a mesh boundary 610 N times (i.e., N boundary smoothing passes). In one implementation, N is equal to approximately 30.

Prior to performing an additional boundary smoothing pass, the user may be provided with an option to assign additional pinned vertex constraints to vertices 620 in the mesh 605. Additionally, the user may be provided with an option to re-draw portions of the mesh boundary 610. Additional boundary smoothing passes may then be performed based on the pinned constraints and/or re-drawn portions inputted by the user.

If an additional boundary smoothing pass is to be performed, then the boundary smoothing engine 155 selects another vertex 620 at step 730. If no additional boundary smoothing passes are to be performed, then the boundary smoothing engine 155 optionally performs an inflation operation at step 795. In general, performing a boundary smoothing pass on the mesh boundary 610 may shrink the mesh boundary 610. Consequently, in order to return the mesh boundary 610 to its initial shape and size, an inflation operation may be performed. During the inflation operation, vertices 620 associated with the mesh boundary 610 are moved by an inflation distance in a direction that is perpendicular to the mesh boundary 610. In one implementation, the inflation distance may be approximately the same distance that a vertex 620 was moved during one or more boundary smoothing passes. Additional discussion of the inflation operation is provided below with respect to FIGS. 9A-9C.

Figures 8A, 8B, 8C:
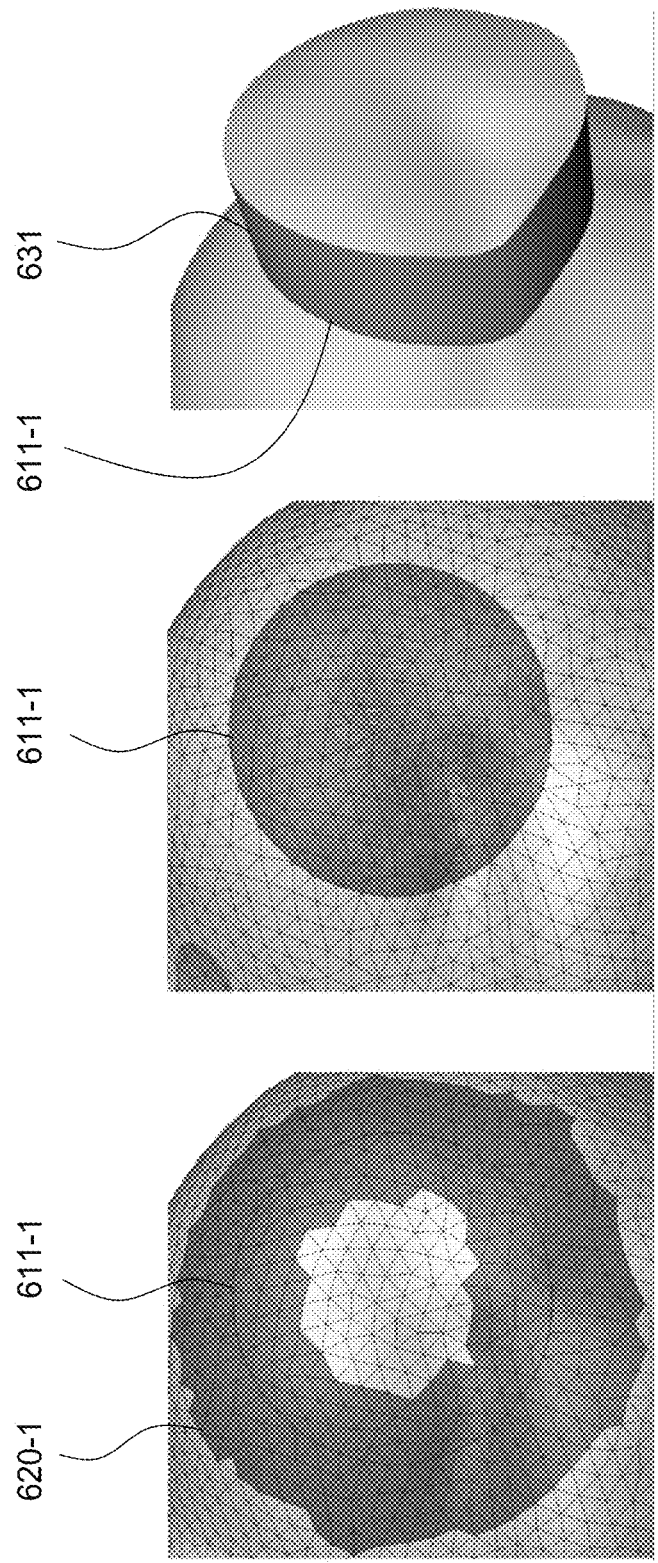
FIGS. 8A-8C illustrate a smoothed mesh boundary and smoothed mesh extrusion generated with the boundary smoothing engine, according to one embodiment of the present invention.

FIGS. 8A-8C illustrate a smoothed mesh boundary 611-1 and smoothed mesh extrusion 631 generated with the boundary smoothing engine 155, according to one embodiment of the present invention. As shown, performing multiple boundary smoothing passes on a mesh boundary 610 produces a smoothed mesh boundary 611-1. Additionally, performing one or more mesh refinement passes on a region of vertices 620-1 that are proximate to the mesh boundary 610 may reduce mesh distortions generated during the boundary smoothing operation and produce a regular mesh of relatively uniform primitives in and around the mesh boundary 610. Finally, as shown in FIG. 8C, the smoothed mesh extrusion 631 generated from the smoothed mesh boundary 611-1 has a clean, aesthetic appearance.

FIGS. 9A-9C illustrate a smoothed mesh boundary 611-2 and an inflated mesh boundary 612 generated with the boundary smoothing engine 155, according to one embodiment of the present invention. As shown, performing multiple boundary smoothing passes on the mesh boundary 610-2 produces a smoothed mesh boundary 611-2 while preserving the approximate initial shape of the mesh boundary 610-2. Additionally, by performing an inflation operation, the initial shape of the mesh boundary 610-2 may be more accurately represented. For example, as shown in FIG. 9C, one or more vertices 620 associated with the smoothed mesh boundary 611-2 may be moved an inflation distance in a direction perpendicular to the smoothed mesh boundary 611-2. Thus, shrinkage of the one or more regions of the mesh boundary 610-2 may be corrected by performing an inflation operation on one or more vertices 620 associated with the smoothed mesh boundary 611-2.

In sum, a boundary smoothing engine receives a selection of a mesh boundary and performs one or more smoothing passes which shift and align the locations of the vertices associated with the mesh boundary. The boundary smoothing engine may further project the smoothed locations of the boundary vertices onto the initial surface of the mesh to preserve the mesh shape during smoothing. An inflation step also may be performed by the boundary smoothing engine to compensate for boundary shrinkage that may occur during the smoothing process.

One advantage of the techniques described herein is that a user is able to perform smoothing of a mesh boundary (e.g., to produce a high-quality mesh extrusion having smooth edges) without significantly distorting surrounding regions of the mesh. Additionally, by incrementally shifting vertex locations, re-projecting the smoothed locations onto the initial surface, and/or performing an inflation step, the general size and shape of the mesh boundary and mesh may be preserved during the smoothing process.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for smoothing boundaries associated with meshes of primitives, the method comprising:
   receiving a mesh of primitives that has a mesh boundary and a three-dimensional initial surface that represents a three-dimensional surface of the mesh of primitives prior to performing a boundary smoothing operation;
   performing one or more iterations of the boundary smoothing operation on the mesh boundary, wherein each iteration includes:
      identifying a first vertex associated with the mesh boundary and having a first location,
      identifying a second vertex having a second location and a third vertex having a third location, wherein both the second vertex and third vertex are proximate to the first vertex,
      determining a fourth location based on the second location and the third location, and
      moving the first vertex to the fourth location;
   determining an inflation direction that is substantially perpendicular to the mesh boundary at the fourth location;
   determining a fifth location based on the inflation direction, the fourth location, and an inflation distance that is equal to a distance between the first location and the fourth location; and
   moving the first vertex from the fourth location to the fifth location.

2. The method of claim 1, wherein determining the fourth location is further based on a smoothing strength factor.

3. The method of claim 2, wherein determining the fourth location comprises:
   determining an average location based on the second location and the third location;
   determining a first distance between the average location and the first location;
   multiplying the first distance by the smoothing strength factor to determine a weighted distance; and
   adding the weighted distance to the first location to determine the fourth location.

4. The method of claim 1, wherein the mesh boundary comprises a closed loop of triangle edges.

5. The method of claim 1, wherein the second vertex and third vertex are associated with the mesh boundary.

6. The method of claim 1, further comprising performing a mesh refinement pass on a plurality of primitives that are proximate to the mesh boundary.

7. The method of claim 1, further comprising:
   performing a smoothing operation on a plurality of vertices proximate to the mesh boundary to determine a first plurality of smoothed locations;
   performing a three-dimensional projection operation to project the first plurality of smoothed locations onto the three-dimensional initial surface of the mesh of primitives to determine a second plurality of smoothed locations; and
   moving the plurality of vertices to the second plurality of smoothed locations.

8. A non-transitory computer-readable storage medium including instructions that, when executed by a processor, cause the processor to smooth boundaries associated with meshes of primitives by performing the steps of:
   receiving a mesh of primitives that has a mesh boundary and a three-dimensional initial surface that represents a three-dimensional surface of the mesh of primitives prior to performing a boundary smoothing operation;
   performing one or more iterations of the boundary smoothing operation on the mesh boundary, wherein each iteration includes:
      identifying a first vertex associated with the mesh boundary and having a first location,
      identifying a second vertex having a second location and a third vertex having a third location, wherein both the second vertex and third vertex are proximate to the first vertex,
      determining a fourth location based on the second location and the third location, and
      moving the first vertex to the fourth location;
   determining an inflation direction that is substantially perpendicular to the mesh boundary at the fourth location;
   determining a fifth location based on the inflation direction, the fourth location, and an inflation distance that is equal to a distance between the first location and the fourth location; and
   moving the first vertex from the fourth location to the fifth location.

9. The non-transitory computer-readable storage medium of claim 8, wherein determining the fourth location is further based on a smoothing strength factor.

10. The non-transitory computer-readable storage medium of claim 9, wherein determining the fourth location comprises:
    determining an average location based on the second location and the third location;
    determining a first distance between the average location and the first location;
    multiplying the first distance by the smoothing strength factor to determine a weighted distance; and
    adding the weighted distance to the first location to determine the fourth location.

11. The non-transitory computer-readable storage medium of claim 8, wherein the mesh boundary comprises a closed loop of triangle edges.

12. The non-transitory computer-readable storage medium of claim 8, wherein the second vertex and third vertex are associated with the mesh boundary.

13. The non-transitory computer-readable storage medium of claim 8, further comprising performing a mesh refinement pass on a plurality of primitives that are proximate to the mesh boundary.

14. The non-transitory computer-readable storage medium of claim 8, further comprising:
    performing a smoothing operation on a plurality of vertices proximate to the mesh boundary to determine a first plurality of smoothed locations;
    performing a three-dimensional projection operation to project the first plurality of smoothed locations onto the three-dimensional initial surface of the mesh of primitives to determine a second plurality of smoothed locations; and
    moving the plurality of vertices to the second plurality of smoothed locations.

15. A computing device, comprising:
a memory including instructions; and
a processor that is coupled to the memory and, when executing the instructions, is configured to smooth boundaries associated with meshes of primitives by:
receiving a mesh of primitives that has a mesh boundary and a three-dimensional initial surface that represents a three-dimensional surface of the mesh of primitives prior to performing a boundary smoothing operation;
performing one or more iterations of the boundary smoothing operation on the mesh boundary, wherein each iteration includes:
identifying a first vertex associated with the mesh boundary and having a first location,
identifying a second vertex having a second location and a third vertex having a third location, wherein both the second vertex and third vertex are proximate to the first vertex,
determining a fourth location based on the second location and the third location, and
moving the first vertex to the fourth location;
determining an inflation direction that is substantially perpendicular to the mesh boundary at the fourth location;
determining a fifth location based on the inflation direction, the fourth location, and an inflation distance that is equal to a distance between the first location and the fourth location; and
moving the first vertex from the fourth location to the fifth location.

16. The computing device of claim 15, wherein determining the fourth location comprises:

determining an average location based on the second location and the third location;
determining a first distance between the average location and the first location;
multiplying the first distance by a smoothing strength factor to determine a weighted distance; and
adding the weighted distance to the first location to determine the fourth location.

17. A non-transitory computer-readable storage medium including instructions that, when executed by a processor, cause the processor to perform the steps of:
receiving a mesh of primitives that has a mesh boundary and a three-dimensional initial surface that represents a three-dimensional surface of the mesh of primitives prior to performing a boundary smoothing operation;
identifying a first vertex associated with the mesh boundary and having a first location;
identifying a second vertex having a second location and a third vertex having a third location, wherein both the second vertex and third vertex are proximate to the first vertex;
determining a fourth location based on the second location and the third location;
moving the first vertex to the fourth location;
determining an inflation direction that is substantially perpendicular to the mesh boundary at the fourth location;
determining a fifth location based on the inflation direction, the fourth location, and an inflation distance that is equal to a distance between the first location and the fourth location; and
moving the first vertex from the fourth location to the fifth location.

* * * * *